(12) United States Patent
Berthelot et al.

(10) Patent No.: US 9,890,235 B2
(45) Date of Patent: Feb. 13, 2018

(54) PROCESS FOR PREPARING AN ORGANIC FILM AT THE SURFACE OF A SOLID SUPPORT BY TRANSFER OR BY SPRAYING (75) Inventors: Thomas Berthelot, Les Ulis (FR); Pascal Viel, Meudon (FR); Alexandre Garcia, Ivry sur Seine (FR); Bruno Jousselme, Massy (FR); Cecile Baudin, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/005,116

(22) PCT Filed: Mar. 21, 2012

(86) PCT No.: PCT/EP2012/054989
§ 371 (c)(1),
(2), (4) Date: Nov. 1, 2013

(87) PCT Pub. No.: WO2012/126943
PCT Pub. Date: Sep. 27, 2012

(65) Prior Publication Data
US 2014/0044884 A1   Feb. 13, 2014

(30) Foreign Application Priority Data
Mar. 22, 2011  (FR) .................................... 11 52348

(51) Int. Cl.
*C08F 2/48* (2006.01)
*C08F 291/00* (2006.01)
(Continued)

(52) U.S. Cl.
CPC ............ *C08F 291/00* (2013.01); *B05D 1/185* (2013.01); *B82Y 30/00* (2013.01); *B82Y 40/00* (2013.01);
(Continued)

(58) Field of Classification Search
CPC .......... C08F 291/00; C09D 4/00; B05D 1/185; B05D 3/06; B05D 3/067; B82Y 30/00; B82Y 40/00
(Continued)

(56) References Cited

U.S. PATENT DOCUMENTS 4,889,792 A * 12/1989 Palazzotto ................. 430/281.1
6,187,834 B1 * 2/2001 Thayer et al. ............... 522/15
(Continued)

FOREIGN PATENT DOCUMENTS

| WO | 2005033378 A1 | 4/2005 |
| WO | 2006097611 A2 | 9/2006 |
| WO | 2008078052 A2 | 7/2008 |

OTHER PUBLICATIONS

Palacin et al. "Molecule-to-Metal Bonds: Electrografting Polymers on Conducting Surfaces" ChemPhysChem 2004, 5, 1468-1481.*
(Continued)

*Primary Examiner* — Robert S Walters, Jr.
(74) *Attorney, Agent, or Firm* — Pearne & Gordon LLP (57) ABSTRACT A method is provided for preparing an organic film on the surface of a solid support including the steps of (a) applying, to the surface, by transfer or by spraying, a solution containing at least one cleavable aryl salt; and (b) subjecting the solution to a UV or visible irradiation, such that irradiation radical entities are formed from the cleavable aryl salt and an organic film is grafted. Further provided is a kit of elements for the implementation of such a method.

15 Claims, 4 Drawing Sheets (51) Int. Cl.
 *C09D 4/00* (2006.01)
 *B05D 1/18* (2006.01)
 *B82Y 30/00* (2011.01)
 *B82Y 40/00* (2011.01)
 *B05D 3/06* (2006.01)

(52) U.S. Cl.
 CPC .............. *C09D 4/00* (2013.01); *B05D 3/06* (2013.01); *B05D 3/067* (2013.01)

(58) Field of Classification Search
 USPC .......................................................... 427/508
 See application file for complete search history.

(56) References Cited

U.S. PATENT DOCUMENTS

| | | |
|---|---|---|
| 8,288,009 B2 | 10/2012 | Deniau et al. |
| 2007/0281148 A1 | 12/2007 | Bureau et al. |
| 2008/0145706 A1 | 6/2008 | Mevellec et al. |
| 2008/0193668 A1 | 8/2008 | Mevellec et al. |
| 2009/0286308 A1 | 11/2009 | Berthelot et al. |
| 2010/0304273 A1 | 12/2010 | Berthelot et al. |
| 2010/0310800 A1 | 12/2010 | Berthelot et al. |
| 2010/0311857 A1 | 12/2010 | Berthelot et al. |
| 2010/0323119 A1* | 12/2010 | Berthelot et al. ............. 427/454 |
| 2011/0256567 A1 | 10/2011 | Berthelot et al. |
| 2012/0219809 A1 | 8/2012 | Benedetto et al. |
| 2012/0282417 A1 | 11/2012 | Garcia et al. |
| 2012/0312688 A1 | 12/2012 | Berthelot et al. |
| 2013/0276176 A1 | 10/2013 | Polesel-Maris et al. |

OTHER PUBLICATIONS

Crivello et al. "Photoinitiated Cationic Polymerization" Ann. Rev. Mater. Sci. 1983, 13, pp. 173-190.*
Palacin, S., et al., "Molecule-to-metal bonds: electrografting polymers on conducting surfaces", "Chennphyschem", Oct. 18, 2004, pp. 1468-1481 (Abstract), vol. 5, No. 10.
Palacin, S., et al., "Molecule-to-metal bonds: electrografting polymers on conducting surfaces", "Chemphyschem", Oct. 18, 2004, pp. 1468-1481, vol. 5, No. 10.
Bouriga, M., et al., "Sensitized Photografting of Diazonium Salts by Visible Light.", "Chemistry of Materials", Dec. 3, 2012, pp. 90-97, vol. 25.
Merritt, E., et al., "Diaryliodonium salts: a journey from obscurity to fame", "Angew Chem Int Ed Engl", Oct. 28, 2009, pp. 9052-9070, vol. 48.

* cited by examiner

PROCESS FOR PREPARING AN ORGANIC FILM AT THE SURFACE OF A SOLID SUPPORT BY TRANSFER OR BY SPRAYING

CROSS-REFERENCE TO RELATED APPLICATIONS

This application is a U.S. national phase under the provisions of 35 U.S.C. § 371 of International Patent Application No. PCT/EP12/54989 filed Mar. 21, 2012, which in turn claims priority of French Patent Application No. 1152348 filed Mar. 22, 2011. The disclosures of such international patent application and French priority patent application are hereby incorporated herein by reference in their respective entireties, for all purposes.

TECHNICAL FIELD

The present invention relates to the field of organic surface coatings, where said coatings are in the form of organic films.

It relates more particularly to a method for preparing an organic coating on an electrically conductive or non-conductive surface, by transfer or spraying of a reactive or activatable solution able to produce an organic coating taking the form of an organic film grafted covalently onto this surface.

STATE OF THE PRIOR ART

There are currently several techniques allowing thin organic films to be produced on substrates.

Some of these techniques do not allow any actual grafting between the film and the coated surface. Among these techniques, methods by centrifugation ("spin coating"), by immersion ("dip coating") or by vaporisation ("spray coating") may be mentioned. Other techniques such as plasma deposition or photochemical activation (or photoactivation) enable an adherent film to be obtained without the formation of bonds at the interface between the film and the surface being clearly established.

Finally, other techniques allow actual grafting of an organic coating on the surface of a solid support, but do not apply to all types of polymer and all types of surface. Cataphoresis, or a cationic electroplating method, enable conductive surfaces to be covered using filled polymers, which are synthesised before deposition. Self-assembly of single-layers is based on a specific chemical reaction between a portion of a molecular precursor and certain "receptor" sites of the surface, and therefore requires use of specific precursor-surface pairs. Finally, electrografting of polymers is a technique based on initiation followed by electro-induced polymerisation, by chain propagation, of electro-active monomers on the surface of interest, acting simultaneously as electrode and as polymerisation initiator [1]. Electrografting requires the use, firstly, of precursors suited to its initiation mechanism by reduction and propagation and, secondly, of a surface which is either electrically conductive or semi-conductive.

Recently, a method allowing covalently grafted organic surfaces to be produced, under non-electrochemical conditions, which is easy to implement over a wide choice of surfaces, was proposed. This process, notably described in international application WO 2008/078052, implies radical chemical grafting, which allows a covalent bond to be established in a single, simple step [2].

This new technique uses molecular entities, notably derived from cleavable aryl salts such as salts of diazonium, having a single electron to form bonds of the covalent bond type with the surface of interest to be grafted, where said molecular entities are generated independently of the surface on which they are intended to be grafted. These molecular entities are grafted on a surface, whether electrically conductive or semi-conductive, or insulating.

The method described in international application WO 2008/078052 is implemented by immersion in reaction tanks. Indeed, the solid support onto the surface of which the organic film must be grafted is immersed in a tank filled with a reaction solution including cleavable aryl salts and possibly ethylenic unsaturation monomers.

Localised grafting of the organic film is also envisaged in international application WO 2008/078052. However, this variant implements masks used to cover localised areas of the surface of the solid support. These masks are eliminated, when the method has been accomplished, which indeed leads to the elimination of the organic film grafted on the masks.

The inventors continued their work to identify any means enabling the method described in international application WO 2008/078052 to be improved still further, and notably to improve it in terms of consumption of reagents and of localisation of the grafting.

DESCRIPTION OF THE INVENTION

The present invention enables the aim which the inventors set themselves to be attained, and therefore relates to an improved method for grafting an organic film, under non-electrochemical conditions, on at least a portion of the surface of a solid support.

Indeed, the inventors' work has enabled a method of covalent grafting of an organic film on the surface of a solid support, based on the method described in international application WO 2008/078052, to be developed, using a minimum quantity of reagents.

More particularly, the method according to the present invention implies no longer the immersion of the solid supports to be grafted in suitable solutions, designated in the present document by "synthetic solutions", "reaction solutions" or "reactive solutions", but application of the latter by spraying or transfer directly onto the surface of the solid support to be grafted.

This direct application firstly enables the quantity of solutions used to be managed, since only the required quantity of material is used. Since some of the solutions which may be used contain solvents, this limitation of the quantity of solutions used indeed restricts the quantity of emitted volatile organic compounds (VOC).

Application by transfer or by spraying allows great spatial management of the deposition of the solution and, consequently, of the grafting, which makes such a solution appropriate for localised grafting and, if required, structuring of the surface of the solid support or "patterning".

Finally, application by transfer or by spraying is suitable, unlike the technique by immersion, for scrolling parts such as plastic strips, and for continuous production. It is also suitable for parts which cannot be handled, particularly parts of large dimensions, such as the hulls of ships, pipelines, etc. Similarly, the method according to the present invention may, bearing in mind its ease of implementation, be used for the production of single parts.

However, the application of very small volumes of reaction solution necessarily has some disadvantages. Indeed, the inventors' work has shown that, unlike the method by immersion described in international application WO 2008/078052, oxygen may be a factor limiting, or inhibiting, radical chemical grafting in the context of the method according to the present invention.

In fact there is a continuum in all situations which range from industrial reaction tanks to microreactors, i.e. to the drop or to the droplet, and also including beakers. In all these situations oxygen poses a problem, but in a graduated way. It depends on the relative concentration between the oxygen which plays the role of "killer" of radicals and of growing radical ends. Without wishing to be bound by any particular theory, in a beaker the first radicals formed by the method of international application WO 2008/078052 are "killed" by the oxygen, by this means enabling this oxygen to be consumed. The following radicals therefore find less oxygen, and participate in the radical chemical reaction. Recolonisation of the medium by oxygen is not as rapid as this, particularly since the volume is substantial (greater distance to be covered). Conversely, the smaller the volumes, the greater the resupply by oxygen is prejudicial, due to very short length and depth of oxygen diffusion. Consequently, from a size of reactor of the drop or droplet type, as used in the context of the present invention, oxygen is not consumed faster by chemistry than it is contributed by diffusion. In this case, the radical chemical grafting may be compromised, since the chemistry has a speed for producing radicals which is itself limiting.

To compensate for this disadvantage, it may be necessary to implement radical chemical grafting in the presence of an oxygen-poor atmosphere, and notably in the presence of an inert atmosphere, such as an atmosphere of nitrogen, or in a glovebox as presented in example I below. However, such constraints do not allow implementation for all the previously envisaged supports.

The inventors have shown that the use of non-electrochemical conditions of the photochemical type enable this disadvantage to be compensated. Indeed, these conditions enable many radical species to be generated instantaneously which suddenly reduce the actual oxygen content of a microreactor. It is possible to speak of a peak effect, seen from the viewpoint of the radicals, and of a sudden depletion effect, seen from the viewpoint of the oxygen. This being so, the radical chemical grafting may be terminated before the oxygen reappears by a gaseous diffusion in the reaction solution of very small volume.

The present invention thus relates to a method for preparing an organic film on the surface of a solid support, where this method includes the steps consisting in:

a) applying, onto said surface, by transfer or by spraying, a solution containing at least one cleavable aryl salt;

b) subjecting said solution to a UV or visible irradiation, by means of which radical entities are formed from the cleavable aryl salt and an organic film is grafted.

In step (a) of the method according to the invention, the term "application by transfer" is understood to mean the application or deposition of a fine layer of reaction solution. "Fine layer" is understood to mean a layer not exceeding 5 mm thick, notably between 1 nm and 1 mm thick, and in particular between 5 nm and 200 nm thick.

The techniques of application by transfer are techniques well known to those skilled in the art, notably in the field of paints or printing, and notably printing techniques of the flexography, pad printing and screen printing types. They may require, for application of the reaction solution, a pen, a paintbrush, a roller, a marker, a pad or a micro-pad.

In step (a) of the method according to the invention, the term "application by spraying" is understood to mean the application or deposition of drops of reaction solution on the surface of the solid support.

The volume of the drops used in the context of the present invention is between 1 pl and 400 µl, and notably between 2 pl and 200 µl. It should be noted that, when the spraying technique used is notably the inkjet technique, the volume of drops obtained is in the low range proposed above. Indeed, in this case, the volume of drops is between 1 pl and 5 µl, notably between 2 pl and 2 µl, in particular between 5 pl and 500 pl and very particularly between 10 pl and 100 pl. With some of the volumes used, the term "droplets" or "microdroplets" may be used to define the drops obtained. It should be stressed that when they are deposited, the drops may merge to form a fine layer of reaction solution, as defined for the application by transfer.

The techniques of application by spraying are techniques well known to those skilled in the art, and may require, for application of the reaction solution, a spray, an electrostatic spray, a centrifugal spray, an atomiser, a mist-maker, an airbrush, a device of the inkjet type, a syringe, a device of the spotter type and/or a brush.

Among the different techniques of application envisaged such as coating with a pen, coating with a paintbrush, coating with a roller, (micro)padding, spraying, atomisation, inkjet or spotting, some provide the possibility of structuring the grafted organic film.

Thus, this is the case in particular in the inkjet technique through the programming of the operation of the nozzles, padding through the manufacture of the patterns of the pad. As a variant, this structuring may be obtained, in the context of the present invention, by using an adhesive mask of the stencil type, or habitual photolithography methods.

As explained in international application WO 2008/078052, radical chemical grafting may be applied to a wide choice of electrically insulating, semiconductive or conductive surfaces. The present invention therefore applies to a wide choice of solid supports, notably as envisaged in this international application.

However, due to the advantages of the present invention, the solid support is advantageously a large solid support or a moving solid support, such as a hull of a ship, an architectural construction, a scrolling plastic strip, a scrolling paper strip, a synthetic or natural fabric, a metal sheet or a pipeline.

On the contrary, the solid support according to the present invention may be a small support on to which the application by spraying or transfer in accordance with the present invention allows localised grafting of an organic film. Such a support may be a chip useful in biotechnology of the biochip type and, more particularly, a plastic or metal plate onto which the method according to the invention advantageously consists in spraying the reaction solution by spotting. It may be a support of useful in microelectronics, and in particular in molecular electronics; for example, the surface of a rope or of a capillary, notably with a deposition of the reaction solution by spraying. In addition, just as the organic film, after being grafted by the method according to the invention, may be metallised (cf. below), the method according to the invention notably followed by metallisation may be used to prepare metal layers for the flexible or plastic electronics, or for decorative applications.

The method according to the present invention implements "radical chemical grafting". In the present invention this expression has the same definition as in international application WO 2008/078052. It thus refers to the use of molecular entities having a single electron to form bonds of the covalent bond type with the surface of the solid support, where said molecular entities are generated independently of the surface on which they are intended to be grafted. The radical reaction therefore leads to the formation of covalent bonds between the surface of the solid support and the organic film.

The organic film grafted onto the surface of the solid support thus takes the form of (co)polymers, whether identical or different, principally derived from several identical and/or different monomer units.

As envisaged in international application WO 2008/078052, the monomer units from which the organic film is derived may be units derived solely from one (or more) cleavable aryl salt(s) or derived from at least one cleavable aryl salt and at least one monomer which can be polymerised by radical means, and which is distinct from a cleavable aryl salt. In both the envisaged cases the first molecular unit of the (co)polymers constituting the grafted organic film is derived from a cleavable aryl salt.

A "cleavable aryl salt" is understood to mean, in the context of the present invention, a cleavable aryl salt selected from the group consisting of the salts of aryl diazonium, the salts of aryl ammonium, the salts of aryl phosphonium and the salts of aryl sulfonium. In these salts the aryl group is an aryl group which may be represented by R as defined below.

Among the cleavable aryl salts, compounds of the following formula (I) may be cited in particular:

where:
A represents a monovalent anion and
R represent an aryl group.

As aryl groups of cleavable aryl salts, and notably of the compounds of formula (I) above, one may advantageously cite the aromatic or heteroaromatic carbon structures, possibly mono- or poly-substituted, consisting of one or more aromatic or heteroaromatic cycles each having 3 to 8 atoms, where the heteroatom(s) may be N, O, P or S. The substitutent(s) may contain one or more heteroatoms, such as N, O, F, Cl, P, Si, Br or S, and alkyl groups notably $C_1$ to $C_6$ alkyl groups.

Within the cleavable aryl salts, and notably the compounds of formula (I) above, R is, preferably, chosen from among the aryl groups substituted by electron-attracting groups such as $NO_2$, C(O)H, ketones, CN, $CO_2H$, $NH_2$ (in the form of $NH_3^+$), esters and halogens. The particularly preferred R groups of the aryl type are the carboxyphenyl, aminophenyl, nitrophenyl and phenyl radicals.

Within the compounds of formula (I) above, A may notably be chosen from among the inorganic anions such as the halides such as $I^-$, $Br^-$ and $Cl^-$, the halogenoborates such as tetrafluoroborate, the perchlorates and the sulfonates and the organic anions such as the alcoholates and the carboxylates.

As compounds of formula (I), it is particularly advantageous to use a compound selected from the group consisting of tetrafluoroborate of phenyldiazonium, 4-nitrophenyldiazonium tetrafluoroborate, 4-bromophenyldiazonium tetrafluoroborate, 4-aminophenyldiazonium chloride, 4-aminomethylphenyldiazonium chloride, 2-methyl-4-chlorophenyldiazonium chloride, 4-benzoylbenzenediazonium tetrafluoroborate, 4-cyanophenyldiazonium tetrafluoroborate, 4-carboxyphenyldiazonium tetrafluoroborate, 4-acetamidophenyldiazonium tetrafluoroborate, 4-phenylacetic diazonium acid tetrafluoroborate, 2-methyl-4-[(2-methylphenyl)diazenyl]benzenediazonium sulphate, 9,10-dioxo-9,10-dihydro-1-anthracenediazonium chloride, 4-nitronaphtalenediazonium tetrafluoroborate and naphtalenediazonium tetrafluoroborate.

In the context of the present invention, as in the context of international application WO 2008/078052, the cleavable aryl salt may be either introduced into the reaction solution without preparation, or prepared in situ, notably in this solution.

When the cleavable aryl salt is prepared in situ, a precursor of such a cleavable aryl salt is advantageously used. The expression "precursor of a cleavable aryl salt" is understood to mean, in the context of the present invention, a molecule separate from the said cleavable aryl salt by a single operating step which is easy to implement.

Precursors generally have greater stability than the cleavable aryl salt under the same environmental conditions. For example, arylamines are precursors of the salts of aryl diazonium. Indeed, by a simple reaction, for example, with $NaNO_2$ in an acidic aqueous medium, or with $NOBF_4$ in an organic medium, the corresponding salts of aryl diazonium may be formed.

A precursor advantageously used in the context of the present invention is a precursor of aryl diazonium salts of the following formula (II):

where R is as previously defined.

As non-restrictive examples, a precursor which may be used in the context of the present invention is, in particular, selected from the group consisting of 4-aminophenylamine (or p-phenylenediamine or again 1,4-diaminophenylene), 4-nitrophenylamine, 4-amino-benzoic acid and 4-aminomethylphenylamine.

In the case of a preparation in situ, it may be applied, by transfer or spraying, a solution containing at least one precursor of a cleavable aryl salt and at least one element, enabling this precursor to be transformed into the corresponding cleavable aryl salt, such as $NaNO_2$ in an acidic aqueous medium or with $NOBF_4$ in an organic medium.

In the case of a preparation on the surface of the solid support, it may be applied, by transfer or spraying, a $1^{st}$ solution containing the precursor of a cleavable aryl salt, and subsequently a $2^{nd}$ solution containing at least one element, enabling this precursor to be transformed into the corresponding cleavable aryl salt, such as such as $NaNO_2$ in an acidic aqueous medium or $NOBF_4$ in an organic medium. In the latter case the technique of application of the $1^{st}$ solution and that of the $2^{nd}$ solution may be identical or different.

For example, it may be envisaged to spray a solution containing an amine ($1^{st}$ solution) and then to spray on the same surface area a solution containing $NaNO_2$ ($2^{nd}$ solution). It may also be envisaged to transfer the $1^{st}$ solution by means of a paintbrush, and then to spray the $2^{nd}$ solution onto the fine layer obtained.

However, and more particularly, the cleavable aryl salt is introduced as it into the reaction solution.

The expression "monomer which can be polymerised by radical means" is understood to mean a monomer able to be polymerised in radical conditions after initiation by a radical chemical entity. Typically this is a monomer containing at least one bond of the ethylenic type, i.e. a molecule of the ethylenic type, or a molecule with ethylenic unsaturation.

Among the latter, the vinylic monomers, notably the monomers described in international applications WO 2005/033378 and WO 2006/097611 [3, 4], are concerned in particular.

According to a particularly advantageous form of embodiment of the invention, the vinylic monomer(s) is/are selected from the monomers of the following formula (III):

where groups $R_1$ to $R_4$, which are identical or different, represent a non-metallic monovalent atom, such as a halogen atom, a hydrogen atom, a saturated or unsaturated chemical group, such as an alkyl or aryl group, a nitrile, a carbonyl, an amine, an amide or a —$COOR_5$ group in which $R_5$ represents a hydrogen atom or a $C_1$-$C_{12}$ alkyl group and preferably a $C_1$-$C_6$ alkyl group.

The monomers of above formula (II) are selected in particular from the group consisting of acrylic acid, vinyl acetate, acrylonitrile, methacrylonitrile, methyl methacrylate, ethyl methacrylate, butyl methacrylate, propyl methacrylate, hydroxyethyl methacrylate (HEMA), hydroxypropyl methacrylate, glycidyl methacrylate and their derivatives; the acrylamides and notably the methacrylamides of amino-ethyl, -propyl, -butyl, -pentyl and -hexyl, the cyanoacrylates, the di-acrylates and dimethacrylates, the triacrylates and trimethacrylates, the tetra-acrylates and tetramethacrylates (such as pentaerythritol tetramethacrylate), styrene and its derivatives, parachloro-styrene, pentafluoro-styrene, N-vinyl pyrrolidone, 4-vinyl pyridine, 2-vinyl pyridine, the vinyl, acryloyl or methacryloyl halides, divinylbenzene (DVB), and more generally the vinylic cross-linking agents or cross-linking agents made of acrylate or methacrylate, and their derivatives.

In the context of the method of the invention, step (b) corresponds to the step consisting in subjecting the cleavable aryl salt to non-electrochemical conditions, as defined in international application WO 2008/078052. However, and as previously proven, such conditions are limited, in the present invention, to photochemical non-electrochemical conditions, and consist in subjecting the cleavable aryl salt to irradiation (or exposure) in the UV or visible spectrum.

The wavelength used in step (b) of the method will be chosen, without any inventive effort, depending on the cleavable aryl salt used. Every wavelength belonging to the UV spectrum or to the visible spectrum may be used in the context of the present invention. Advantageously, the wavelength applied is between 300 and 700 nm, notably between 350 and 600 nm, and in particular between 380 and 550 nm.

Irradiation in the visible and/or in the UV spectrum may be obtained by means of a UV lamp, an excimer lamp, a desk lamp, a laser, etc.

The period of irradiation in the context of step (b) of the method according to the invention is between 1 s and 1 h, notably between 5 s and 30 min, in particular between 15 s and 15 min and more particularly between 30 s and 10 min.

In a 1st form of implementation, step (a) of the method according to the present invention is accomplished before step (b) of the method.

In this 1st form of implementation, the reaction solution containing at least one cleavable aryl salt is deposited (or applied) on the surface of the solid support before this solution is subjected to UV-visible irradiation.

In this 1st form of implementation, the reaction solution containing at least one aryl salt may also contain at least one monomer which can be polymerised by radical means, and which is distinct from said cleavable aryl salt as previously defined.

As a variant, the reaction solution containing at least one cleavable aryl salt may be applied, and then a 2nd distinct solution containing at least one monomer which can be polymerised by radical means is applied onto the same area of the surface. Application of the 2nd solution may be accomplished by the same technique as the one used to apply the reaction solution, or by a different technique chosen from among the techniques of application by transfer or by spraying, as previously defined, by means of which the surface of the solid support is coated with a solution, in the form of drops or of a layer, containing at least one cleavable aryl salt, and at least one monomer which can be polymerised by radical means, and which is distinct from said cleavable aryl salt.

In this 1st form of implementation, step (b) may consist in subjecting this solution to a UV-visible irradiation as previously defined.

It should be noted that the separation of the step of transfer or of spraying (step (a)) from the step of activation (b) has an additional advantage, notably in the context of large supports, for which transfer or spraying may last for a long time. In this case the start of the chemical reaction is triggered by the light only when the transfer or spraying is terminated.

In a 2nd form of implementation, steps (a) and (b) of the method according to the present invention are implemented simultaneously.

In this 2nd form of implementation, the reaction solution containing at least one cleavable aryl salt and possibly at least one monomer able to be polymerised by radical means, and which is distinct, is subjected to a UV-visible irradiation when it is applied.

It should be observed that, in this form of implementation, it is advantageous to limit the UV-visible irradiation to the surface on which the reaction surface is in the process of being sprayed or transferred, to prevent the organic film forming in the nozzles and apertures of the means used during the application by spraying as previously defined, and to prevent it blocking them.

The quantity of cleavable aryl salts, of precursors of cleavable aryl salts, of monomers able to be polymerised by radical means and usable in the reaction solution is in accordance with the quantities envisaged in international application WO 2008/078052.

Similarly, the reaction solution used in the context of the present invention may contain, as a solvent, a solvent which may be:
  either a protic solvent, i.e. a solvent which contains at least one hydrogen atom able to be released in the form of a proton and advantageously selected from the group consisting of water, deionised water, distilled water, whether acidified or basic, acetic acid, the hydroxylated solvents such as methanol and ethanol, the liquid glycols of low molecular weight such as ethylene glycol, and mixtures thereof;
  or an aprotic solvent, i.e. a solvent which is not able to release a proton or to accept one under non-extreme conditions, and advantageously selected from dimethylformamide (DMF), acetone, acetonitrile and dimethyl sulfoxide (DMSO);
  or a mixture of at least one protic solvent and at least one aprotic solvent.

As a variant, the reaction solution may contain no solvent. In this case, the reaction solution contains at least one cleavable aryl salt, and at least one monomer as previously defined, where the latter is in liquid form, and acts as a solvent.

The reaction solution used in the context of the present invention may also contain one (or more) surfactant(s), notably selected from the group consisting of the anionic surfactants, the cationic surfactants, the zwitterionic surfactants, the amphoteric surfactants and the neutral (non-ionic) surfactants and, notably, the surfactants described in international patent WO 2008/078052. The surfactant concentration will typically be between 0.5 mM and 5 M approximately, and preferably between 0.1 mM and 150 mM approximately.

The reaction solution which may be transferred or sprayed is advantageously kept in the dark before implementing step (b) of the method according to the invention. In other words, it is advantageous to accomplish the step of preparing the reaction solution, and the step of transferring or spraying it, under low-light conditions. The expression "low-light" is understood to mean a light source the quantity of visible light of which (wavelength of 380 nm to 780 nm) received on a given surface is less than 20 Lux.

More particular conditions directly relating to the application by transfer or by spraying may be applied in the context of the present invention.

Firstly, the reaction solution may contain, in addition to the previously described elements, at least one element selected from the group consisting of a thickening agent, a gelling agent and a cross-linking agent.

This additional element enables the fluidity or viscosity of the reaction solution to be modified. It should be observed that the previously envisaged surfactant agents which enable the evaporation of the reaction solution to be restricted can also influence this modification of the fluidity or viscosity. Consequently, the reaction solution may contain, in addition to the previously described elements, at least one element selected from the group consisting of a thickening agent, a gelling agent, a surfactant and a cross-linking agent.

This additional element is optional. Indeed, if the application technique used in the method according to the invention is an inkjet using a small nozzle, the viscosity of the reaction solution may or must be low, and the presence of an additional element is not necessary in all cases. On the contrary, an additional element may be useful to raise the "drip threshold" of a reaction solution taking the form of a liquid layer deposited on a vertical surface, either by direct coating (paintbrush) or by spraying in thick layers. In these hypotheses, gravity becomes important and it may be necessary to add a modifying element, notably one which increases the viscosity of the reaction solution.

The thickening agents, gelling agents and cross-linking agents which may be used in the context of the present invention are well-known to those skilled in the art. These additives are used, notably, in ink formulations in order to control wettability, viscosity and the drying of the droplets sprayed by inkjet. As illustrative and non-restrictive examples of the thickening agents which may be used, one may cite a polyol such as glycerol and polymers, such as polyethylene glycol, polyacrylic acid, or an acrylic acid-maleic acid copolymer, pre-existing in the reaction solution, of prepolymers, of telechelic polymers or of multi-monomers. A cross-linking agent also enables a thicker organic film to be obtained.

Those skilled in the art will be able to determine, without inventive effort, the necessity of adding such an element and the quantity to use, in accordance with the reaction solution and the type of application used.

The advantages obtained by using as non-electrochemical conditions a UV-visible irradiation may be increased still further by adding, to the reaction solution, an agent favouring the transfer of electrons also designated by the term "photosensitising agent" or "photosensitiser" and possibly a sacrificial electron donor. The method according to the invention is advantageously improved by adding, to the reaction solution, a pair formed by an agent favouring electron transfer and a sacrificial electron donor. The latter, when subjected to UV-visible irradiation, produces a large quantity of electrons.

As illustrative and non-restrictive examples of agents favouring electron transfer, one may cite the ruthenium complexes (II) such as tris-bipyridine ruthenium chloride (II) or again the porphyrins or chlorophyll.

As illustrative and non-restrictive examples of sacrificial electron donors, one may cite isopropanol and the amines of the electron donor type such as trimethylamine, triethylamine, tripropylamine, tributylamine, dimethylethanolamine, dimethyldodecylamine, pyridine, quinoline, isoquinoline and lipidine.

It should be noted that the presence of the agent favouring electron transfer, or the presence of the pair formed by such a photosensitising agent and a sacrificial electron donor, is not mandatory. Comparable results may be obtained without requiring any photosensitiser, notably depending on the nature of the substitutent on the cycle of the cleavable aryl salt. This is, for example, verified when the cleavable aryl salt used is 4-nitrobenzene diazonium: comparable results may be obtained whether or not this salt is used in the presence of tris-bipyridine ruthenium (II) chloride and of triethylamine (respectively, example IV and example III). However, it should be noted that, in the case of many cleavable aryl salts, the presence of the agent favouring electron transfer or the presence of the pair formed by such a photosensitising agent and a sacrificial electron donor enables the grafting obtained to be improved, notably in terms of speed.

Since the sacrificial electron donor may be a base it may be desirable, when preparing the reaction solution, to introduce it into this solution, when the aryl salt has been dissolved and stabilised, notably at an acidic pH. The experimental part below presents procedures for preparing reaction solutions, in an illustrative and non-restrictive manner.

As another variant, when the transfer or spraying has been accomplished, i.e. step (a) as previously defined, a transparent material, either flexible or rigid, may be applied, notably on a small quantity of reaction solution deposited on the material to be treated. This transparent protection enables the contact between the reaction solution and the atmospheric oxygen to be reduced, without disturbing the step of subjection to photochemical non-electrochemical conditions, i.e. step (b) as previously defined. This variant enables the reaction solution to be spread over a large area, without exerting a high pressure, since the capillary forces are sufficient. As an example, 100 µl of reaction solution in the form of gel ink confined under a glass slide typically cover 10 $cm^2$.

The steps of application of the reaction solution by transfer or by spraying and of subjection to photochemical non-electrochemical conditions, i.e. steps (a) and (b) as previously defined, may be repeated at least two, three, four or five times, consequently enabling a multi-layer structure to be obtained. Between each repetition the surface of the solid support may be subjected to a treatment such as a washing to eliminate the unused reagents and the ungrafted oligomers or polymers and/or a drying operation.

In this variant, the previously grafted organic film becomes the surface of the solid support for the implementation of new steps (a) and (b) according to the method of the invention and according to any one of the previously envisaged forms of embodiment and variants. As a consequence, a very thick layer of the multi-layer type formed by several layers of organic films of an identical or different nature may be obtained.

Before applying the reaction solution by transfer or by spraying onto the surface of the solid support, the latter may be subjected to an oxidising (pre-)treatment.

The term "oxidising (pre-)treatment" is understood to mean, in the context of the present invention, a treatment (or pre-treatment) intended to oxidise the surface of the solid support used and/or to prepare this surface for a future oxidation by formation of radicals. An oxidation modifies the surface of the solid support, notably by attaching to it and/or introducing into it oxygen-rich groups such as groups of the carboxylic type (—COOH), hydroxyl type (—OH), alcoxyl type (—OX where X represents an alkyl group, an acyl group or an aroyl group), carbonyl type (—C=O), percarbonic type (—C—O—OH) and sometimes amide type (—CONH).

Such an oxidising treatment is based on two types of surface modifications based on:

physical treatments such as a flame treatment, a treatment by corona effect, by plasma, notably of oxygen, a UV treatment, an X-ray or γ-ray treatment, a treatment by irradiation with electrons and with heavy ions, where said treatments are implemented in the presence of air, oxygen or ozone, or chemical treatments such as a chemical treatment of the Fenton type consisting in bringing into contact the surface of the solid support with a solution containing a peroxide XOOX and ferrous ions ($Fe^{2+}$), a treatment using alcoholic potash, a treatment with a strong or weak acid (HCl, $H_2SO_4$, $HNO_3$, $HClO_4$, $H_3PO_4$, etc.), a treatment using sodium hydroxide, a treatment by a strong oxidiser ($KMnO_4$, $K_2Cr_2O_7$, $KClO_3$ or $CrO_3$ in hydrochloric acid, sulphuric acid, or nitric acid) and a treatment with ozone.

In the context of the present invention, the prior oxidising treatment may consist of a chemical treatment, a physical treatment, a combination of at least two chemical treatments, a combination of at least two physical treatments or a combination of at least one chemical treatment with at least one physical treatment, where said chemical or physical treatment(s) is/are such as previously defined.

The present invention also relates to a method as previously described, and in which steps (a) and (b) are followed by a step consisting in applying, on the organic film obtained, by transfer or spraying, a suspension of nano-objects.

The nano-objects of the suspension may be magnetic, metallic or carbonaceous, and may be chosen from among nanoparticles, nanocrystals, nanowires, nanotubes and nanocolumns. This suspension of nano-objects is advantageously a suspension of nanoparticles.

The organic films grafted according to the method of the present invention may be used for all applications previously envisaged in international application WO 2008/078052 but also in applications derived from the technology described in this application. The grafted films may thus be used in a metallisation method. Steps (a) and (b) of the method according to the invention may thus be followed by a metallisation step.

This latter step may be implemented as described in international application WO 2008/078052, namely by using an organic film grafted in accordance with the present invention, also including nano-objects, and then by putting such a film in contact with a solution containing at least one metal salt able to be reduced by these nano-objects. These nano-objects which may be magnetic, metallic or carbonaceous, are notably nanoparticles, nanocrystals, nanowires, nanotubes or nanocolumns. In addition, these nano-objects may be functionalised as envisaged in international application WO 2008/078052.

The film grafted according to the method of the present invention may contain nano-objects, where the latter are integrated into the film by means of a suspension of nano-objects brought into contact with the film. This action of bringing into contact may be equally an immersion and an application by transfer or by spraying. As a variant, the nano-objects are already present in the reaction solutions used at the time of the method according to the present invention and are, indeed, introduced into the organic film when it is prepared.

Alternatively, this metallisation may consist in using an organic film grafted in accordance with the method according to the present invention having a group (or a structure) able to chelate a metal ion; in putting this film in contact with at least one metal ion; and then in subjecting the film with chelated metal ions to conditions enabling them to be reduced. The metallisation may be obtained either immediately after this reduction, or after bringing into contact with an Electroless bath. The different actions of bringing into contact envisaged are advantageously accomplished by immersion. The group (or structure) capable of chelating metal ions is either present on the film which is grafted by nature (cf. Example II below —COOH/—COO⁻ groups of polyacrylic acid), or introduced into the latter when grafted. This group (or structure) is chosen from among the amines, the amides, the ethers, the carbonyls, the carboxyls, the carboxylates, the phosphines, the phosphine oxides, the thioethers, the disulfides, the ureas, the crown ethers, the aza-crowns, the thio-crowns, the cryptands, the sepulcrates, the podands, the porphyrins, the calixarenes, the pyridines, the bipyridines, the terpyridines, the quinolines, the compounds of orthophenantroline, the naphtols, the iso-naphtols, the thioureas, the siderophores, the antibiotics, ethylene glycol, the cyclodextrines, together with their molecular structures, substituted and/or functionalised from these functional groups, and/or one or more complexing cavity(ies) of the redox lock type.

As another variant, metallisation may be obtained by using a reaction solution containing, in addition to the abovementioned elements, at least one metal salt as previously defined, by means of which the chelation of the metal salt by, or its inclusion in, the organic film is accomplished simultaneously with the grafting of this film on the surface of the solid support. The film with chelated metal ions is then subjected to conditions enabling them to be reduced. The metallisation may be obtained either immediately after this reduction, or after bringing into contact with an Electroless bath. The different actions of bringing into contact envisaged are advantageously accomplished by immersion.

The metallisation may be combined with the previously envisaged multi-layer structure. In this case, at least one $1^{st}$ layer is deposited according to the method of the invention, and then metallised before a 2$^{nd}$ layer is deposited on this 1$^{st}$ plated layer, and then metallised in its turn.

The present invention also relates to a kit of elements for the implementation of a method according to the present invention including:

in a compartment (designated below "1$^{st}$ compartment"), a solution including at least one cleavable aryl salt as previously defined, or a precursor of the latter, as previously defined, and means to apply this solution on the surface of a solid support by transfer or by spraying.

These means are notably chosen from among a paintbrush, a roller, a marker, a pen, a pad, and micro-pad, a spray, an electrostatic spray, a centrifugal spray, an atomiser, a mist-maker, an airbrush, a syringe, a device of the inkjet type, a device of the spotter type and/or a brush.

The kit of elements according to the present invention may also include at least one compartment including one (or more) element(s) chosen from among:

at least one monomer which can be polymerised by radical means, and which is different from the cleavable aryl salt as previously defined, or a solution containing at least one monomer which can be polymerised by radical means, and which is different from the cleavable aryl salt as previously defined, metal salts or a solution containing such salts, at least one nano-object as previously defined, or a suspension of at least one nano-object as previously defined, a solution able to produce a cleavable aryl salt from its precursor as previously defined.

The other compartment of the kit of elements according to the present invention may include 2 or 3 of the abovementioned elements, and advantageously all the abovementioned elements. As a variant, the kit of elements may include one other, two other, three other or four other compartments, each containing one of the abovementioned elements.

Advantageously, an identical or different solvent is contained in each of the abovementioned solutions.

The solutions of the different compartments, and notably of the 1$^{st}$ compartment will, of course, be able to contain other identical or different agents, such as surfactants, thickening agents, gelling agents, cross-linking agents, agents favouring electron transfer, and sacrificial electron donors.

The present invention also relates to a method to produce at least one track in which a liquid of interest may flow over a solid support. This method consists in preparing an organic film which is wettable by said liquid of interest on the surface of said solid support, by means of a method of preparation as previously defined.

This aspect of the present invention is based on the preparation of one (or more) track(s) on the surface of a solid support having wettability with regard to the liquid of interest, whereas the areas surrounding this (or these) tracks are less wettable or non-wettable with regard to this liquid. Indeed, firstly, grafting of the organic film, following a deposition by spraying or transfer of reaction solution, enables tracks of small, well-delimited areas to be obtained. Secondly, a judicious choice of the cleavable aryl salt, and possibly of the monomers which can be polymerised by radical means, enables an organic film to be obtained which is wettable by the liquid of interest, such a choice being routine work for those skilled in the art.

As a reminder, wettability is defined by the contact angle formed by a drop of the liquid of interest with the surface on which the organic film is grafted in the area of the site where this drop is deposited.

Thus, when it is stipulated that the deposition sites are wettable with regard to the liquid, this generally means that a deposited drop of this liquid will form with the deposition site a contact angle generally having a value of less than 70°, and notably less than 60°, whereas, in the case of the non-wettable areas surrounding said site, this means that the contact angle formed between a drop of the liquid and these areas generally has a value of more than 90°, and notably more than 95°. From a practical standpoint, this means that the liquid, when it is deposited over the entire surface of the solid support, is concentrated in the tracks which are wettable by this liquid, and does not remain, or remains only in small quantities, in the non-wettable areas.

From a chemical standpoint, a liquid will wet a solid substrate if it has a chemical affinity with regard to this substrate. Thus, hydrophilic tracks on a less hydrophilic, or hydrophobic, solid support will be wettable with regard to the hydrophilic liquids, and vice versa.

Through the implementation of such a method, it is thus possible to obtain a solid support, notably made of types of inorganic or organic glass, on the surface of which are "integrated" one (or more) directional track(s) in which a liquid of interest may flow, and which act as gutters. This aspect of the invention finds applications for solid supports such as windows, spectacles/masks, windscreens or helmet visors, etc., where the liquid of interest is, in these applications, water, rainwater or seawater.

Other characteristics and advantages of the present invention will also appear to those skilled in the art on reading the examples given below, in an illustrative and non-restrictive manner, with reference to the appended figures.

BRIEF DESCRIPTION OF THE ILLUSTRATIONS

FIG. 6 shows photographs of a polyethylene terephtalate substrate treated by a solution containing a salt of aryl diazonium (NBDT), a monomer which can be polymerised by radical means (AA), a thickening agent (polyacrylic acid), a complex of Ruthenium/Sacrificial Donor (triethylamine) and a copper salt, $CuSO_4$, $5H_2O$, printed by inkjet and irradiated by a desk lamp, and then immersed in a reducing solution (FIG. 6A) followed by a commercially available copper Electroless bath, and finally a Gold Electroless bath, rinsed in water and dried under nitrogen (FIG. 6B).

DETAILED DESCRIPTION OF PARTICULAR EMBODIMENTS

I. Preliminary Work Before the Method of the Invention

I.1. Vaporised Solution.

In a beaker fitted with a magnetic stirring bar, 30 ml of deionised water, 4.5 ml of HEMA (1.1M) and 0.225 g of nitrobenzene diazonium tetrafluoroborate (NBDT) ($2.7 \cdot 10^{-2}$ M) were poured. Lastly, 0.3 ml of a 0.29 M, i.e. $2.5 \cdot 10^{-3}$ M, solution of recently prepared ascorbic acid is poured into the reaction medium.

I.2. Method Implemented.

This functionalisation solution is rapidly poured into the flask of the spray. The latter and a gold plate previously treated by UV-ozone are placed in a glovebox vented 3 times with nitrogen and inflated with nitrogen.

The reaction solution, which is under pressure in the spray, is sprayed onto the plate held in an oblique position. The plate, with a fine continuous layer of liquid deposited on the gold surface, is left in a horizontal position in the glovebox for one hour.

Another gold plate is subjected to the same treatment but outside the glove box.

Figure 1:
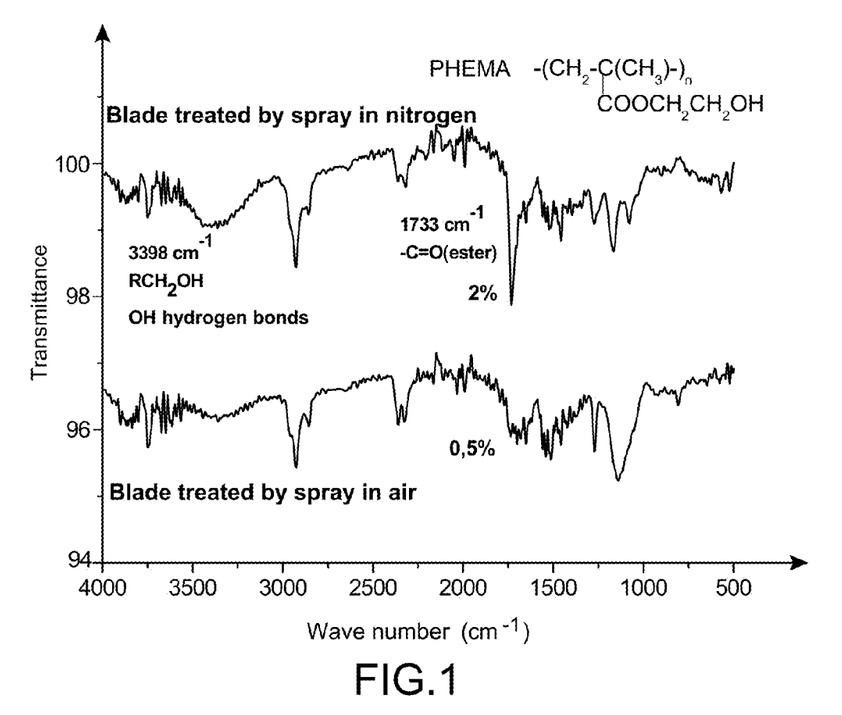
FIG. 1 presents the spectra obtained by Fourier transform infrared spectroscopy (FTIR) of 2 gold plates on which has been sprayed, under ambient air or under nitrogen, a reaction solution containing a salt of aryl diazonium [nitrobenzene diazonium tetrafluoroborate (NBDT)], a monomer which can be polymerised by radical means [HydroxyEthylMethAcrylate (HEMA)] and a chemical initiator (ascorbic acid).

After one hour of reaction the plates are rinsed by water jets, ethanol and acetone, and are then subjected to ultrasound, in the DMF for 2 min, in water, and lastly acetone for 30 s. They are then dried by nitrogen drying before being analysed by FTIR. The FTIR spectra obtained in this manner are represented in FIG. 1.

In ambient air the droplets are in contact with air. The oxygen of the air "kills" the radicals. Initiation reactions and above all propagation reactions are inhibited. Polymerisation does not occur. Only a few oligomers are synthesised.

II. Procedure for Grafting PAA by Means of Inkjet and UV/Visible Irradiation, Followed by Metallisation on Rigid Substrates of Technical Polymers II.1 Grafting of PAA.

Firstly, in order to prevent any pollution or contamination by external agents, the substrates used (i.e. ABS, ABS-PC, polyamide (PA), vinyl polychloride (PVC)) are subjected to a rinsing, depending on their nature, in a solvent and/or industrial detergent (TFD4) for 10 min with ultrasound.

This cleaning is completed by a prior oxidising (pre-) treatment by UV/Ozone ($UV/O_3$) irradiation for 10 min which enables the organic pollutants to be eliminated. For many substrates this UV/Ozone irradiation also induces activation of the surface by oxidisation. This oxidisation leads to an increase of the polarity which causes an increase of the surface energy and therefore a reduction of the contact angle.

The diazonium salts are reduced by irradiation in the UV/Visible spectra for wavelengths notably of 350 to 550 nm.

In addition, to favour the reduction, a ruthenium complex favouring electron transfer and a sacrificial electron donor are added to the reaction medium. The complete system thus contains a diazonium salt/acrylic acid/complex favouring electron transfer made of Ruthenium/Sacrificial Donor.

Thus, 4-nitrobenzene diazonium (NBD; 1.1846 g, $5 \cdot 10^{-2}$ M) was solubilised in a solution of Milli-Q water (100 ml). To this solution, 100 ml of a solution of tris-bipyridine ruthenium (II) chloride (Ru complex; $3.74 \cdot 10^{-3}$ g, $5 \cdot 10^{-5}$ M), 100 ml of AA and 100 ml of triethylamine (TEA, $5 \cdot 10^{-2}$ M) as the sacrificial electron donor are added.

The solution is then deposited directly on the substrate which has been pretreated by various methods. Advantageously this involves inkjet printing, or more simply printing by drop depositing.

The substrate and drops are then irradiated by a UV/visible lamp for a duration of between several seconds to one hour, preferentially from 30 s to 10 min. The samples are then rinsed in succession for 10 min with ultrasound in Milli-Q water, in a 0.1M solution of sodium hydroxide and then once again in Milli-Q water before being dried.

In order to check the grafting of PAA, tests on a gold plate were also undertaken with the same procedure. However, to check the effectiveness of the rinsing, and to ensure that the physisorbed material has been eliminated, the gold substrates were rinsed with additional solvents (Acetone, Ethanol, NaOH and DMF), with ultrasound for 10 min.

The TEA (sacrificial donor)/Ru complex (facilitates the electron transfer) pair enables the reduction of aryl diazonium salt (NBD) to a phenyl radical under the irradiation to be heightened. Without the presence of this pair it is possible to form the film of PAA, but it is slower and metallisation is also possible.

II.2. Characterisation of the deposits of PAA.

This characterisation was undertaken by different methods.

A. Measurement of Contact Angle.

The contact angle was measured on a Dataphysics-OCA15 EC device, fitted with a CCD (Charge-Coupled Device) camera. After grafting of PAA the contact angle falls to around 60°.

The results are shown in the Table 1 below:

TABLE 1

Average of measurements of contact angles for 4 different polymers (ABS, ABS-PC, PA, PVC and gold plate) when blank and after grafting of PAA

|  | ABS | ABS/PC | PA | PVC | Gold plate |
|---|---|---|---|---|---|
| Blank | 90 | 81.8 | 63.2 | 98 | 90 |
| Grafting of PAA | 65.8 | 66 | 63.4 | 67.2° | 56 |

B. Infrared Characterisation.

The infrared spectra were recorded on a Bruker Vertex 70 spectrometer fitted with a Pike-Miracle Attenuated Total Reflection (ATR) accessory. The detector is an MCT. The spectra were obtained after 256 scans with a resolution of 2 $cm^{-1}$.

Figure 2:
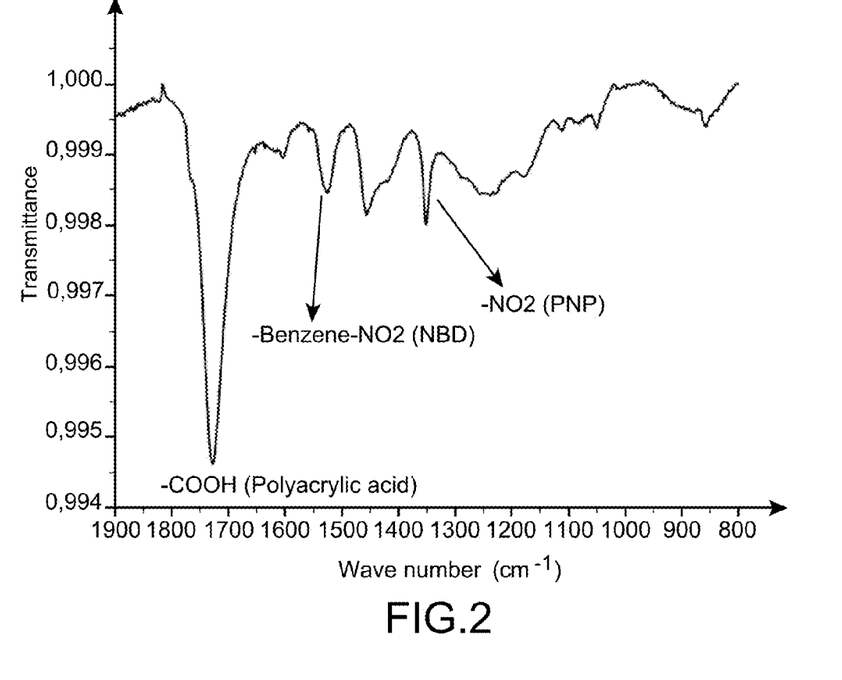
FIG. 2 presents the infrared spectrum of a gold plate on which has been printed by inkjet a reaction solution containing a salt of aryl diazonium [4-nitrobenzene diazonium (NBD)], a monomer which can be polymerised by radical means [Acrylic Acid (AA)] and a complex pair favouring electron transfer made of Ruthenium/Sacrificial Donor, where the radical chemical grafting is initiated by a UV irradiation.

Grafting of PAA is confirmed by the analysis by IR spectrometry. Whatever the substrate, the specific bands at 1715~1732 cm$^{-1}$ (C=O elongation of COOH acid) and 1575~1592 cm$^-$ (C=O elongation of the COO— carboxylate form) are present (FIG. 2).

C. XPS Characterisation.

The XPS analyses were undertaken with a Kratos Axis Ultra DLD spectrometer, using the monochromatic "Al Ka line" at 1486.6 eV. The pass energy of the analyser was maintained constant at 20 eV for $C_{1s}$, base-level analysis. The photoelectron collection angle is 90° relative to the plane of the sample, which provides for a sampling depth of the integrated probe at 15 nm in the case of a dense substrate.

Figure 3:
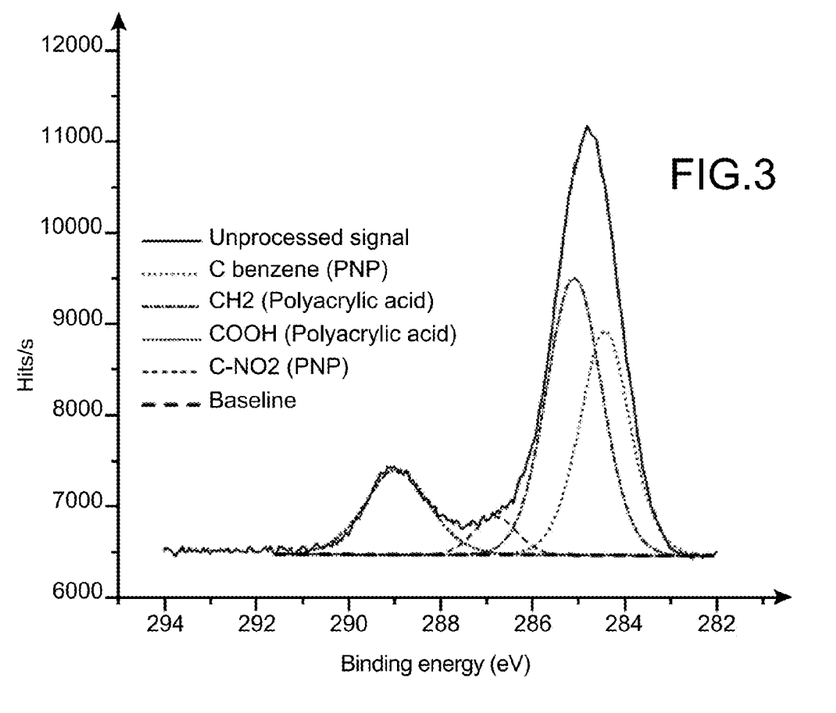
FIG. 3 presents the spectroscopy spectrum of X photoelectrons of the plate treated in accordance with FIG. 2.

After grafting of PAA spectrum $C_{1s}$ is characteristic of the presence of PAA. Indeed, 2 peaks are observed at 289.76 and 285.74 eV, which correspond respectively to the —COOH/COO$^-$ and —CH$_2$/CH groups of polyacrylic acid (FIG. 3).

II.3. Metallisation.

A. Chelation of the Metal Ions.

Chelation of the Cu$^{2+}$ ions is undertaken by immersion for 10 min of the substrate in a copper/ammonia solution ([Cu$^{2+}$]=0.1M/[NH$_3$]=0.6 M) in water. This chelation is followed by a 0.1 M NaOH rinsing for 1 min to eliminate the physisorbed CuSO$_4$.

B. Reduction of the Metal Ions.

The Cu$^{2+}$ ions are reduced by immersion for 10 min of the substrate in a reducing solution of sodium borohydride (NaBH$_4$=0.1 M) in a solution of sodium hydroxide (0.1 M) at 70° C. This reduction is followed by a 0.1 M NaOH rinsing for 1 min to eliminate the physisorbed material (NaBH$_4$, NaOH in particular).

C. Electroless Bath.

The growth of the metal layer is accomplished by immersing the substrate in an industrial copper-plating bath, called "Electroless", manufactured by the company MacDermid (Reference: M Copper 85 MacDermid). As with all metallisation baths, it is a stable solution at ambient temperature which has a metal cation, in the form of CuSO$_4$, a reducer (Formaldehyde), a complexing agent and a constant pH (pH=12) adjusted with sodium hydroxide.

The ideal metallisation temperature is 48° C. Spontaneous metallisation may take place only at the surface of the previously deposited copper metal particles. The latter catalyse the dehydrogenation of the reducers and therefore their oxidisation. The reducers and the complexed copper salts are presumed to be adsorbed at the surface of the metal particles. The sphere of coordination of the copper salts is modified and the electrons of the reducer are sent to the copper ions to form the copper in the metal state. The process is then autocatalytic. Nonetheless, the mechanism of this reduction is still widely studied, and many mathematical models are still attempting to explain it.

The immersion time in this bath determines the thickness of the metal layer deposited on the substrate. In the present case, a 15 min immersion is applied to obtain a 1 μm layer. The samples are then rinsed in Milli-Q water, with ultrasound, for 10 min, before being dried.

II.4. Test on the Metal Layer.

The mechanical adherence between the metal layer and the substrate was studied by an adhesion test consisting in a quantitative scotch test inspired by standard ASTM D3359 scotch test (strip with transverse cut test). This widely used criterion provides a direct comparison of the adherence of the films obtained under different conditions on similar substrates, and is the test used by industrial companies.

A. Principle.

The adhesion test procedure is accomplished in 4 steps described below:

Step 1: Use of a cutting instrument to establish the test area, namely 16 clearly distinct squares on the surface of the metallised sample.

Step 2: Cleaning of the area of the 16 squares using a paintbrush in the cutting direction.

Step 3: Deposition of a strip of adhesive normalised in the direction of the vertical or transverse cut.

Step 4: After 5 min the adhesive is removed with an angle of 60°; the fewer the number of squares torn away the greater the adhesion is.

B. Result.

By taking the example of the PVC grafted with PAA according to the procedure of point 11.1 and metallised according to the procedure of point 11.3, it is observed that no square is torn away after the adhesion test.

III. Procedure for Grafting PAA by Means of Inkjet and UV/Visible Irradiation, Followed by Metallisation on Flexible Substrates of Polyethylene Terephtalate III.1. Grafting of PAA.

Firstly, in order to prevent any pollution or contamination by external agents, the substrates are subjected to rinsing in industrial detergent (TFD4) for 10 min with ultrasound.

The reduction of the diazonium salts is initially accomplished by irradiation in the visible spectrum through use of a 75 W desk lamp. In a second stage the irradiation is also a source of heat, and probably contributes to the acceleration of the polymerisation of the acrylic acid.

To improve the wettability of the solution sprayed by inkjet onto the substrate, a thickening agent is added to the reaction medium. This is a polymer of polyacrylic acid (PAA, 30,000 g/mol).

Lastly, in preparation for the metallisation, a copper salt is added to this solution. The chelation of the copper ions is thus accomplished at the same time as the grafting of PAA. The reaction solution therefore contains a diazonium salt/acrylic acid/PAA thickening agent/CuSO$_4$.

4-nitrobenzene diazonium (NBD; 0.205 g) was solubilised in a solution containing 2 mL of an aqueous acidic solution (0.5 M H$_2$SO$_4$), 2 mL of acrylic acid, 130 mg of thickening agent (PAA) and 240 mg of copper salt (CuSO$_4$, 5H$_2$O).

The solution is then deposited directly on the substrate by printing by inkjet, through the use of a commercially available printer, EPSON Stylus Photo P50.

The substrate+inkjet deposit is then irradiated by a 75 W desk lamp for a period of 10 min.

Figure 4:
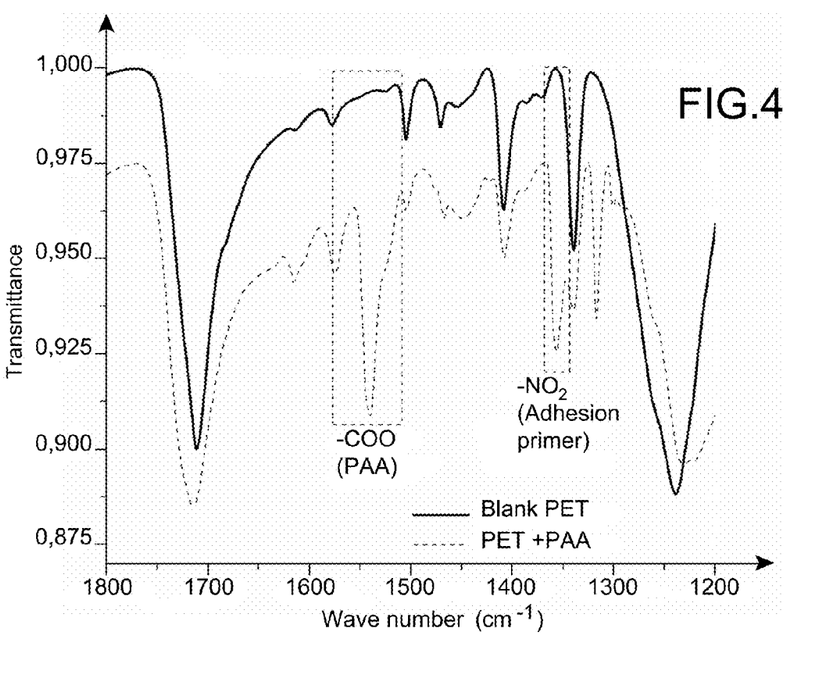
FIG. 4 presents the spectra obtained by FTIR of 2 polyethylene terephtalate substrates. The first is a blank PET and the second is a substrate treated under ambient air, by a solution containing a salt of aryl diazonium [NBDT], a monomer which can be polymerised by radical means (AA), a thickening agent (polyacrylic acid), printed by inkjet and irradiated by a desk lamp, and then rinsed in water and dried under nitrogen.

The grafting of PAA is confirmed by the analysis by IR spectrometry (FIG. 4).

III.2. Reduction of the Metal Ions.

The Cu$^{2+}$ ions are reduced by immersion for 3 min of the substrate in a reducing solution of sodium borohydride (NaBH$_4$=0.1 M) in a solution of sodium hydroxide (0.1 M) at 50° C. This reduction is followed by a 0.1 M NaOH rinsing for 1 min to eliminate the physisorbed material (NaBH$_4$, NaOH in particular).

III.3. Electroless Bath.

The growth of the metal layer is accomplished by immersing the substrate in an industrial copper-plating bath, called "Electroless", manufactured by the company MacDermid (Ref: M Copper 85 MacDermid). As with all metallisation baths, it is a stable solution at ambient temperature which has a metal cation, in the form of CuSO$_4$, a reducer (Formaldehyde), a complexing agent and a constant pH (pH=12) adjusted with sodium hydroxide.

The ideal metallisation temperature is 48° C. Spontaneous metallisation may take place only at the surface of the previously deposited copper metal particles. These catalyse the dehydrogenation of the reducers and therefore their oxidisation. The reducers and the complexed copper salts are presumed to be adsorbed at the surface of the metal particles. The sphere of coordination of the copper salts is modified and the electrons of the reducer are sent to the copper ions to form the copper in the metal state. The process is then autocatalytic. Nonetheless, the mechanism of this reduction is still widely studied, and many mathematical models are still attempting to explain it.

The immersion time in this bath determines the thickness of the metal layer deposited on the substrate. In the present case, a 15 min immersion is applied to obtain a 1 μm layer. The samples are then rinsed in Milli-Q water, with ultrasound, for 10 min, before being dried.

Figure 5A:
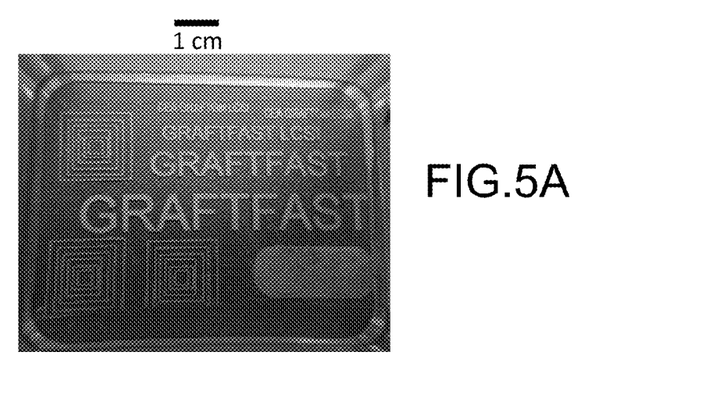
FIGS. 5A and 5B are photographs at different enlargements of a polyethylene terephtalate substrate treated as described for FIG. 4 and then immersed in a reducing solution (NaBH$_4$ 0.1M, NaOH 0.1M, 3 min, 50° C.) and finally a commercially available Electroless bath made of copper (M Copper 85) for 15 min, rinsed in water and dried under nitrogen.
Figure 5B:
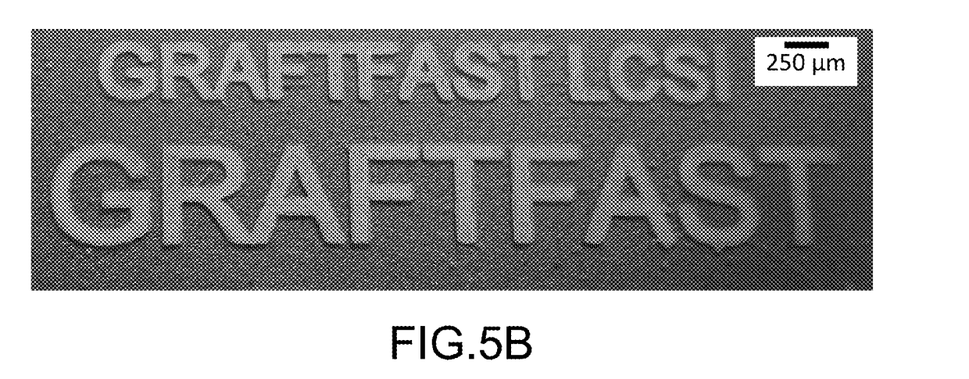

Photographs of a substrate of polyethylene terephtalate treated in accordance with the procedures of points III.1, III.2 and III.3 are shown in FIGS. 5A and 5B.

III.4. Result of Scotch Test for Adhesion of the Metal Layer.

By carrying out the scotch test inspired by previously described standard ASTM D3359, it is observed that no square is torn away after the adhesion test.

IV. Another Procedure for Grafting PAA by Means of Inkjet and UV/Visible Irradiation, Followed by Metallisation on Flexible Substrates of Polyethylene Terephtalate IV.1. Grafting of PAA.

Firstly, in order to prevent any pollution or contamination by external agents, the substrates are subjected to rinsing in industrial detergent (TFD4) for 10 min with ultrasound.

The reduction of the diazonium salts is initially accomplished by irradiation in the visible spectrum through use of a 75 W desk lamp. In a second stage the irradiation is also a source of heat, and probably contributes to the acceleration of the polymerisation of the acrylic acid.

In addition, to favour the reduction, a ruthenium complex favouring electron transfer and a sacrificial electron donor are added to the reaction medium.

Secondly, to improve the wettability of the solution sprayed by inkjet on to the substrate, a thickening agent is added to the reaction medium. In this case this is a polymer of polyacrylic acid (30,000 g/mol).

Lastly, in preparation for the metallisation, a copper salt is added to this solution. The chelation of the copper ions is thus accomplished at the same time as the grafting of PAA.

The complete system thus contains a diazonium salt/acrylic acid/complex favouring electron transfer made of Ruthenium/Sacrificial Donor/PAA thickening agent/$CuSO_4$.

4-nitrobenzene diazonium (NBD; 0.205 g) was solubilised in a solution containing 2 mL of a solution of tris-bipyridine ruthenium (II) chloride (Ru complex; $5·10^{-3}$ M), 2 ml of a solution of triethylamine (TEA, $5·10^{-2}$ M) as a sacrificial electron donor, 2 mL of an aqueous acidic solution ($H_2SO_4$ at 0.5 M), 2 mL of acrylic acid, 130 mg of thickening agent and 240 mg of a copper salt ($CuSO_4$, $5H_2O$).

The solution is then deposited directly on the substrate by printing by inkjet, through the use of a commercially available printer, EPSON Stylus Photo P50.

The substrate+inkjet deposit is then irradiated by a desk lamp for a period of between 30 s and 10 min.

IV.2. Reduction of the Metal Ions.

The $Cu^{2+}$ ions are reduced by immersion for 3 min of the substrate in a reducing solution of sodium borohydride ($NaBH_4$=0.1 M) in a solution of sodium hydroxide (0.1 M) at 50° C. This reduction is followed by a 0.1 M NaOH rinsing for 1 min to eliminate the physisorbed material ($NaBH_4$, NaOH in particular).

IV.3. Electroless Bath.

In order to obtain a gold coating, the growth of the metal layer is accomplished by means of immersion in two Electroless baths, firstly of copper and then of gold.

Initially, the growth of the metal layer is accomplished by immersing the substrate in an industrial copper-plating bath, called "Electroless", manufactured by the company MacDermid (Ref: M Copper 85 MacDermid). As with all metallisation baths, it is a stable solution at ambient temperature which has a metal cation, in the form of $CuSO_4$, a reducer (Formaldehyde), a complexing agent and a constant pH (pH=12) adjusted with sodium hydroxide.

The ideal metallisation temperature is 48° C. Spontaneous metallisation may take place only at the surface of the previously deposited copper metal particles. The latter catalyse the dehydrogenation of the reducers and therefore their oxidisation. The reducers and the complexed copper salts are presumed to be adsorbed at the surface of the metal particles. The sphere of coordination of the copper salts is modified and the electrons of the reducer are sent to the copper ions to form the copper in the metal state. The process is then autocatalytic. Nonetheless, the mechanism of this reduction is still widely studied, and many mathematical models are still attempting to explain it.

The immersion time in this bath determines the thickness of the metal layer deposited on the substrate. In the present case, a 15 min immersion is applied to obtain a 1 μm layer. The samples are then rinsed in Milli-Q water, with ultrasound, for 10 min, before being dried.

In a second stage the growth of a gold layer on the copper-plated substrate is accomplished by immersion in a gold Electroless bath, based on the same principle as the copper Electroless bath. The Electroless bath is manufactured by the company Alfa AESAR, and contains 3.7 g/l of metallic cation. The deposition temperature must be between 60 and 70° C. and the deposition speed is approximately 1 μm/h. In the present case, a 30 min immersion is applied to obtain a 0.5 μm layer.

Figure 6A:
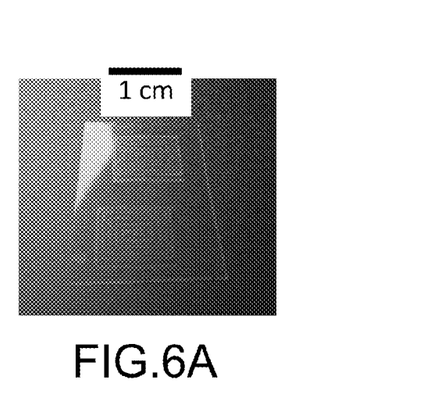
Figure 6B:
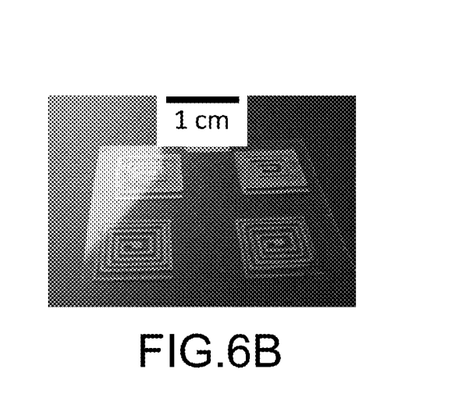

FIG. 6 shows photographs of the polyethylene terephtalate treated in accordance with the procedure of point IV.1 (FIG. 6A) and treated in accordance with the procedures of points IV.1, IV.2 and IV.3 (FIG. 6B). In the latter case, the gold plating of the printed tracks is visible.

IV.4. Result of Scotch Test for Adhesion of the Metal Layer.

By carrying out the scotch test inspired by previously described standard ASTM D3359, it is observed that no square is torn away after the adhesion test.

V. Localised Treatment of Plexiglas® Surfaces According to the Method of the Invention This localised treatment of Plexiglas® surfaces is implemented by a method of the stencil type, in which areas are masked by a vinyl adhesive. This method enables a localised treatment to be applied reproducing the hollowed-out patterns of the applied stencil.

V.1. Preparation of the Plexiglas® Plates.

The Plexiglas® support is washed in soapy water, rinsed in water and then dried. It is then cleaned with acetone and then with alcohol, and dried in gaseous nitrogen.

The vinyl mask is bonded to the cleaned surface and the hollowed-out portions of the mask are cleaned with a solution of paratoluene sulfonic acid (0.9 g for 30 ml of water). The hollowed-out portions are then rinsed in water, dried under gaseous nitrogen and ready to be coated by one of the following formulations.

V.2. Tested Formulations.

Three different formulations were tested.

A. 1st Example of Formulation:

200 mg of 4-nitrophenyl diazonium tetrafluoroborate are added to an aqueous solution of tris-bipyridine ruthenium (II) chloride hexahydrate (4 ml, $5 \cdot 10^{-4}$ M) and triethylamine (2 ml, 0.1 M). Acrylic acid (2 ml) and acrylic acid-maleic acid copolymer in the form of a sodium salt (200 mg, average mass M=50,000 g·mol$^{-1}$) are then added to the previous solution.

This formulation is prepared immediately before use to take account of its lack of stability.

B. 2nd Example of Formulation:

100 mg of 4-nitrophenyl diazonium tetrafluoroborate are dissolved in 2 ml of deionised water and 1 ml of pure acrylic acid and the solution is thoroughly stirred until complete dissolution. 1 ml of trielyamine (0.1 M) is then added to this solution. After thorough stirring, 50% of glycerol is poured in the 4 ml of the previous solution. The solution is thoroughly stirred and 50 it of a solution of tris-bipyridine ruthenium (II) chloride hexahydrate ($5 \cdot 10^{-4}$ M) are added to obtain the final ready-to-use solution.

This formulation is stable for at least one day when stored in darkness.

C. 3rd Example of Formulation:

100 mg of 4-nitrophenyl diazonium tetrafluoroborate are dissolved in 2 ml of deionised water and 1 ml of pure acrylic acid and the solution is thoroughly stirred until complete dissolution. 100 mg of acrylic acid-maleic acid copolymer in the form of a sodium salt (average mass M=50,000 g·mol$^{-1}$) dissolved in 1 ml of trielyamine (0.1 M) are added to this solution. The solution is thoroughly stirred and 50 µl of a solution of tris-bipyridine ruthenium (II) chloride hexahydrate ($5 \cdot 10^{-4}$ M) are added to obtain the final ready-to-use solution.

This formulation is stable for at least one day when stored in darkness.

V.3. Irradiation of the Mask.

The hollowed-out portions of the vinyl mask are coated with one of the three previous formulations and covered with a transparent flexible or rigid material (glass, PET sheet, etc.) in order to spread the solution satisfactorily over the mask or over the surface if there is no mask.

Irradiation is undertaken using a halogen desk lamp (OSRAM, 100 W) irradiating in the visible spectrum, and lasts preferentially for 25 min. A minimum time of 15 min is recommended.

Figure 7:
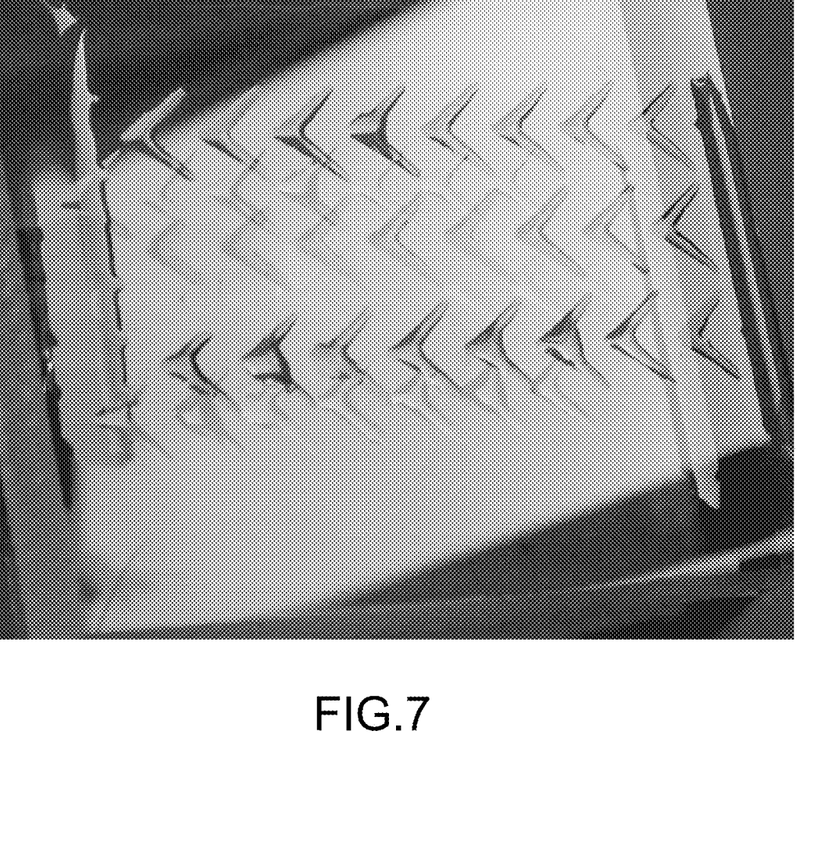
FIG. 7 is a photograph of a Plexiglas® plate measuring 10×6 cm treated by formulation N° 2 as defined at point V below, and then passed under a trickle of water from the tap.

The transparent flexible or rigid material is then removed and the Plexiglas® plate is rinsed in water and dried in gaseous nitrogen. The vinyl mask is detached and the Plexiglas® plate is rinsed in water and in alcohol, and dried under gaseous nitrogen. The design of the mask is obtained by the small flow of water over the Plexiglas® plate (FIG. 7).

During the procedure the formation of bubbles under the glass slide is a sign of the mechanism of cleavage of the diazonium salt. Partial masking of the light by an aluminium sheet inhibits the formation of these bubbles during the experiment.

Such a method may be used to modify locally the hydrophilicity/hydrophobicity of the substrate to produce "tracks" which a hydrophilic/hydrophobic liquid may follow as it flows, thereby preventing complete wetting of the substrate.

REFERENCES

[1] Palacin et al., "Molecule-to-metal bonds: Electrografting polymers on conducting surfaces". Chem. Phys. Chem., 2004. 5(10): 1469-1481.
[2] International patent WO 2008/078052 in the name of CEA published on Jul. 3, 2008.
[3] International patent WO 2005/033378 in the name of CEA published on Apr. 14, 2005.
[4] International patent WO 2006/097611 in the name of CEA published on Sep. 21, 2006.

The invention claimed is:

1. A method for preparing an organic film on the surface of a solid support by radical chemical grafting, comprising:
   a) applying onto said surface, by transfer or by spraying, a solution containing at least one salt of aryl diazonium, a photosensitizing agent, and a sacrificial electron donor, wherein applying by transfer consists of applying or depositing a layer of the solution not exceeding 5 mm thick onto the surface and applying by spraying consists of applying or depositing drops of the solution onto the surface wherein the volume of the drops is between 1 pl and 400 µL and
   b) subjecting said solution to a UV or visible irradiation, by means of which radical entities are formed from the salt of aryl diazonium and an organic film in the form of (co)polymers is grafted to the surface;
   wherein at least one monomer unit of the (co)polymers constituting the grafted organic film is derived from the salt of aryl diazonium, and
   wherein said method is performed under ambient air.

2. The method according to claim 1, wherein said application by transfer requires a pen, a paintbrush, a roller, a marker, a pad or a micro-pad.

3. The method according to claim 1, wherein said application by spraying requires an electrostatic spray, a centrifugal spray, an atomiser, a mist-maker, an airbrush and/or a device of the inkjet type.

4. The method according to claim 1, wherein said step (a) is accomplished before said step (b).

5. The method according to claim 1, wherein said steps (a) and (b) are implemented simultaneously.

6. The method according to claim 1, wherein said solution also contains at least one monomer which can be polymerised by radical means, and which is distinct from said salt of aryl diazonium.

7. The method according to claim 6, wherein said solution also contains at least one element selected from the group consisting of a thickening agent, a gelling agent, a surfactant and a cross-linking agent.

8. A method to produce at least one track in which a liquid of interest may flow over a solid support, comprising preparing an organic film which is wettable by said liquid of interest on the surface of said solid support according to a method as defined in claim 6.

9. The method according to claim 1, wherein said solution also contains at least one element selected from the group consisting of a thickening agent, a gelling agent, a surfactant and a cross-linking agent.

10. The method according to claim 1, wherein said steps (a) and (b) are repeated at least two, three, four or five times, enabling a multi-layer structure to be obtained.

11. The method according to claim 1, wherein, prior to application, by transfer or by spraying, of the solution onto the surface of the solid support, the surface is subjected to an oxidising (pre-)treatment.

12. The method according to claim 1, wherein said steps (a) and (b) are followed by a step comprising applying, on the organic film obtained, by transfer or spraying, a suspension of nano-objects.

13. The method according to claim 12, wherein said suspension of nano-objects is a suspension of nanoparticles.

14. The method according to claim 1, wherein said steps (a) and (b) are followed by a step of metallisation.

15. A method to produce at least one track in which a liquid of interest may flow over a solid support, comprising preparing an organic film which is wettable by said liquid of interest on the surface of said solid support according to a method as defined in claim 1.

* * * * *

UNITED STATES PATENT AND TRADEMARK OFFICE
CERTIFICATE OF CORRECTION

PATENT NO. : 9,890,235 B2
APPLICATION NO. : 14/005116
DATED : February 13, 2018
INVENTOR(S) : Thomas Berthelot et al.

It is certified that error appears in the above-identified patent and that said Letters Patent is hereby corrected as shown below:

In the Specification

Column 11, Line 30, replace "7-ray" with -- γ-ray --.

Column 17, Line 2, replace "cm⁻" with -- $cm^{-1}$ --.

Column 21, Line 23, replace "50 it" with -- 50 μl --.

Signed and Sealed this
Twenty-fourth Day of July, 2018

Andrei Iancu
*Director of the United States Patent and Trademark Office*